US012576800B2

(12) United States Patent
    Jackson

(10) Patent No.:  US 12,576,800 B2
(45) Date of Patent:  Mar. 17, 2026

(54) ROBUST HIGH VOLTAGE CABLE ROUTING/MOUNTING COUPLING

(71) Applicant: Caterpillar Inc., Peoria, IL (US)

(72) Inventor: Robert A. Jackson, Edwards, IL (US)

(73) Assignee: Caterpillar Inc., Peoria, IL (US)

( * ) Notice:    Subject to any disclaimer, the term of this patent is extended or adjusted under 35 U.S.C. 154(b) by 0 days.

(21) Appl. No.: 18/817,543

(22) Filed:    Aug. 28, 2024

(65)                Prior Publication Data

US 2024/0416850 A1        Dec. 19, 2024

Related U.S. Application Data

(62) Division of application No. 17/709,999, filed on Mar. 31, 2022, now Pat. No. 12,122,307.

(51) Int. Cl.
     *B60R 16/02*        (2006.01)
     *B60R 16/023*       (2006.01)
     *B60R 16/027*       (2006.01)
     *B60R 16/03*        (2006.01)
     *H01B 7/00*         (2006.01)
     *H01B 7/02*         (2006.01)
     *H01B 7/18*         (2006.01)
     *H02G 3/04*         (2006.01)
(52) U.S. Cl.
     CPC ...... *B60R 16/0207* (2013.01); *B60R 16/0231* (2013.01); *B60R 16/027* (2013.01); *B60R 16/03* (2013.01); *H02G 3/0406* (2013.01); *H01B 7/0009* (2013.01); *H01B 7/02* (2013.01); *H01B 7/1875* (2013.01)

(58) Field of Classification Search
     CPC ............ B60R 16/0207; B60R 16/0231; B60R 16/027; B60R 16/03; H02G 3/0406; H01B 7/0009; H01B 7/02; H01B 7/1875
     See application file for complete search history.

(56)                References Cited

U.S. PATENT DOCUMENTS 4,786,757 A     11/1988  Owensby et al.
     6,452,102 B1     9/2002  Deforest, Jr. et al.
                    (Continued)

FOREIGN PATENT DOCUMENTS

DE      112017002344 B4     5/2022
     JP         2007234422 A     9/2007
     KR        20140107773 A     9/2014

OTHER PUBLICATIONS

"U.S. Appl. No. 17/709,999, Notice of Allowance mailed Jun. 21, 2024", 8 pgs.
                    (Continued)

*Primary Examiner* — Carlos Amaya

(57)                ABSTRACT

A cable assembly for a work machine, includes a cable and a collet. The cable includes an electrically conductive core, an insulating layer covering the core; an electrically conductive shield layer covering the insulating layer over a first length of the cable, and the insulating layer is exposed over a second length of the cable. The shield layer is folded back over a fold length, and the fold length includes two layers of the shield layer. The collet includes an inner sleeve and an outer sleeve extending over a portion of the inner sleeve at an end of the collet. The two shield layers of the fold length are arranged over the inner sleeve and under the outer sleeve, the insulating layer is arranged under the inner sleeve, and the second length of the cable extends through the inner sleeve.

10 Claims, 7 Drawing Sheets

100

108  116  118  114  106  110  102  120  104  104  112

(56)                    References Cited

U.S. PATENT DOCUMENTS

| | | | |
|---|---|---|---|
| 7,709,739 | B2 | 5/2010 | Ferragut et al. |
| 10,483,735 | B1 | 11/2019 | Gretz et al. |
| 10,644,491 | B2 | 5/2020 | Korcz et al. |
| 2009/0075528 | A1 | 3/2009 | Osborn, Jr. et al. |
| 2009/0111337 | A1 | 4/2009 | Kiely |

OTHER PUBLICATIONS

"U.S. Appl. No. 17/709,999, Restriction Requirement mailed Apr. 2, 2024", 6 pgs.

"U.S. Appl. No. 17/709,999, Response filed May 31, 2024 to Restriction Requirement mailed Apr. 2, 2024", 2 pgs.

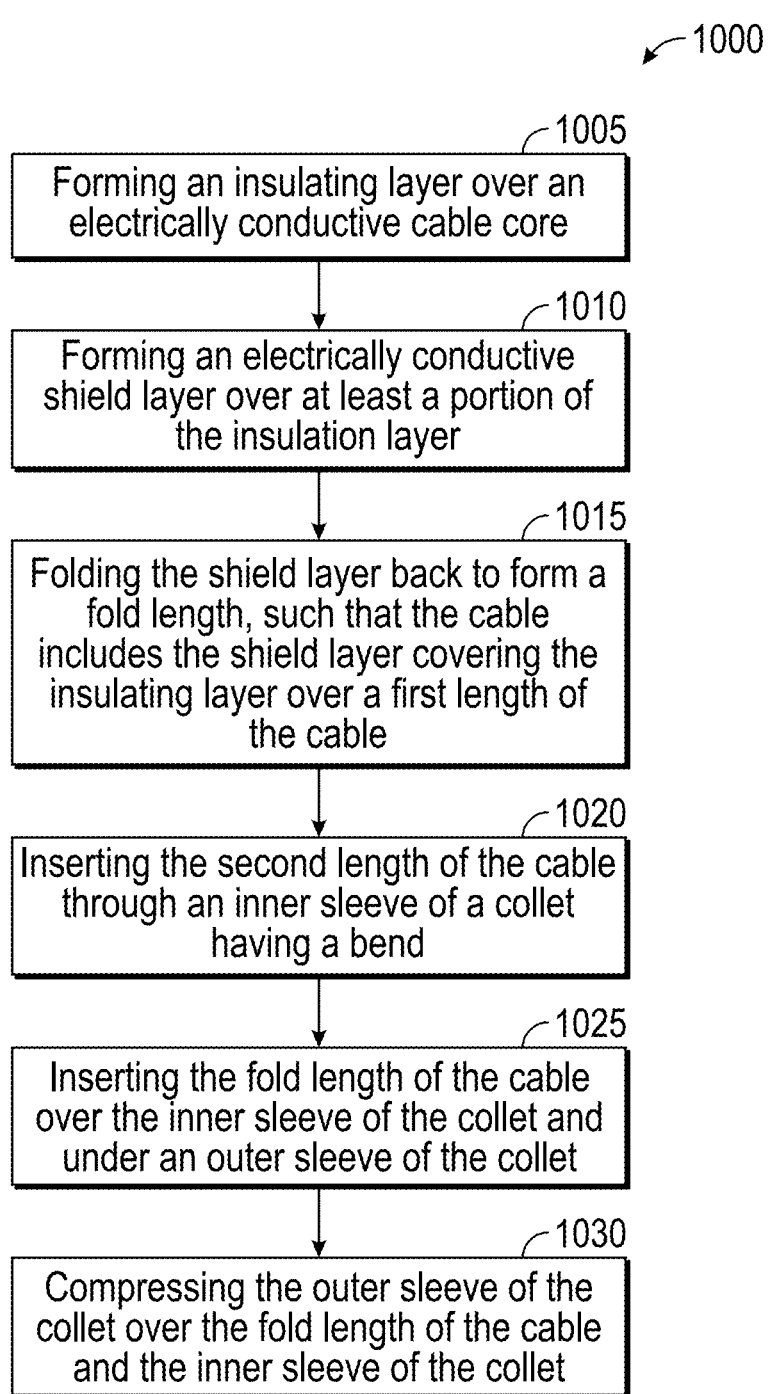

1000

1005
Forming an insulating layer over an electrically conductive cable core

1010
Forming an electrically conductive shield layer over at least a portion of the insulation layer 1015
Folding the shield layer back to form a fold length, such that the cable includes the shield layer covering the insulating layer over a first length of the cable 1020
Inserting the second length of the cable through an inner sleeve of a collet having a bend 1025
Inserting the fold length of the cable over the inner sleeve of the collet and under an outer sleeve of the collet 1030
Compressing the outer sleeve of the collet over the fold length of the cable and the inner sleeve of the collet

FIG. 10

ROBUST HIGH VOLTAGE CABLE ROUTING/MOUNTING COUPLING

CLAIM OF PRIORITY

This application is a divisional of U.S. patent application Ser. No. 17/709,999, filed on Mar. 31, 2022, the benefit of priority of which is claimed hereby, and which is incorporated by reference herein in its entirety.

TECHNICAL FIELD

This document relates to electric powered work machines and in particular to techniques of routing the electric power to different compartments of the work machines.

BACKGROUND

Powering a large moving work machine (e.g., a wheel loader) with an electric motor requires a large mobile electric energy source that can provide current of hundreds of Amperes (Amps) at hundreds of volts. This large mobile energy source can include multiple large capacity battery cells connected in parallel as battery strings that provide the sustained energy power needed by a large electric-powered moving work machine. High-capacity cables route the electric power between various compartments of the work machine. The physical requirements of cables that handle high-capacity electric power make it difficult to efficiently route electric power around the work machine.

SUMMARY OF THE INVENTION

Electric powered large moving work machines use large capacity energy sources that source high voltage electrical energy to the work machines. Work machines can be exposed to environmental conditions (e.g., vibration, water, temperature, etc.) that require robust cabling. The thickness and stiffness of robust high-capacity cables can make it difficult to conform the cables (e.g., by bending) to the space or compartment in which it is intended to be used.

A cable assembly for a work machine includes a cable and a collet. The cable includes an electrically conductive core, an insulating layer covering the core; an electrically conductive shield layer covering the insulating layer over a first length of the cable, and the insulating layer is exposed over a second length of the cable. The shield layer is folded back over a fold length, and the fold length includes two layers of the shield layer. The collet includes an inner sleeve and an outer sleeve extending over a portion of the inner sleeve at an end of the collet. The shield layers of the fold length of the shield layer are arranged over the inner sleeve and under the outer sleeve, the insulating layer is arranged under the inner sleeve, and the second length of the cable extends through the inner sleeve.

An example method of making a cable assembly for a work machine includes forming an insulating layer over an electrically conductive cable core; forming an electrically conductive shield layer over at least a portion of the insulating layer; folding the shield layer back to form a fold length such that the cable includes the shield layer covering the insulating layer over a first length of the cable, the insulating layer exposed over a second length of the cable, and two shield layers covering the insulating layer over the fold length of the cable; inserting the second length of the cable through an inner sleeve of a collet having a bend; inserting the shield layers of the fold length of the cable over the inner sleeve of the collet and under an outer sleeve of the collet; and compressing the outer sleeve of the collet over the fold length of the cable and the inner sleeve of the collet.

An example collet for a cable of a work machine includes an inner sleeve and an outer sleeve. The inner sleeve has a tube shape with a bend. The inner sleeve includes a first sleeve portion at an end of the collet and including a constant inner diameter and an outer diameter that increases from an end of the inner sleeve, and a second sleeve portion including a constant outer diameter. The outer sleeve extends over the first sleeve portion of the inner sleeve.

BRIEF DESCRIPTION OF THE DRAWINGS

FIG. 10 is a flow diagram of an example of a method of making a cable assembly for a work machine in accordance with this disclosure.

DETAILED DESCRIPTION

Examples according to this disclosure are directed to methods and devices for routing high voltage electrical energy between compartments of a work machine. Techniques to provide efficient and robust cable routing on a work machine are described.

Figure 1:
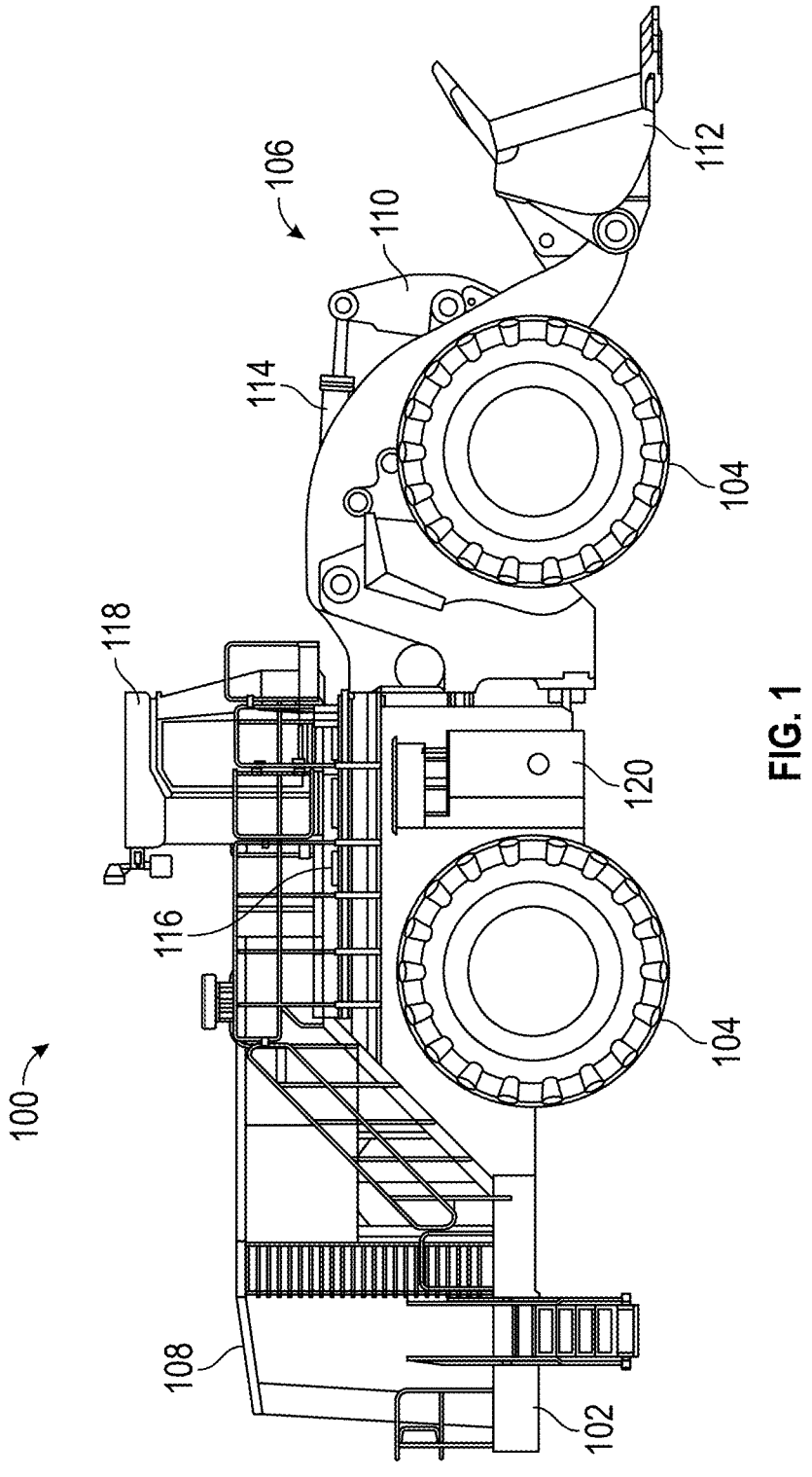
FIG. 1 is an elevation view depicting an example work machine in accordance with this disclosure.

FIG. 1 depicts an example machine 100 in accordance with this disclosure. In FIG. 1, machine 100 includes frame 102, wheels 104, implement 106, and a speed control system implemented in one or more on-board electronic devices like, for example, an electronic control unit or ECU. Example machine 100 is a wheel loader. In other examples, however, the machine may be other types of machines related to various industries, including, as examples, construction, agriculture, forestry, transportation, material handling, waste management, and so on. Accordingly, although a number of examples are described with reference to a wheel loader machine, examples according to this disclosure are also applicable to other types of machines including graders, scrapers, dozers, excavators, compactors, material haulers like dump trucks, along with other example machine types.

Machine 100 includes frame 102 mounted on four wheels 104, although, in other examples, the machine could have more than four wheels. Frame 102 is configured to support and/or mount one or more components of machine 100. For example, machine 100 includes enclosure 108 coupled to frame 102. Enclosure 108 can house, among other components, an electric motor to propel the machine over various terrain via wheels 104. In some examples, multiple electric motors are included in multiple enclosures at multiple locations of the machine 100.

Machine 100 includes implement 106 coupled to the frame 102 through linkage assembly 110, which is configured to be actuated to articulate bucket 112 of implement 106. Bucket 112 of implement 106 may be configured to transfer material such as, soil or debris, from one location to another. Linkage assembly 110 can include one or more cylinders 114 configured to be actuated hydraulically or pneumatically, for example, to articulate bucket 112. For example, linkage assembly 110 can be actuated by cylinders 114 to raise and lower and/or rotate bucket 112 relative to frame 102 of machine 100.

Platform 116 is coupled to frame 102 and provides access to various locations on machine 100 for operational and/or maintenance purposes. Machine 100 also includes an operator cabin 118, which can be open or enclosed and may be accessed via platform 116. Operator cabin 118 may include one or more control devices (not shown) such as, a joystick, a steering wheel, pedals, levers, buttons, switches, among other examples. The control devices are configured to enable the operator to control machine 100 and/or the implement 106. Operator cabin 118 may also include an operator interface such as, a display device, a sound source, a light source, or a combination thereof.

Machine 100 can be used in a variety of industrial, construction, commercial or other applications. Machine 100 can be operated by an operator in operator cabin 118. The operator can, for example, drive machine 100 to and from various locations on a work site and can also pick up and deposit loads of material using bucket 112 of implement 106. As an example, machine 100 can be used to excavate a portion of a work site by actuating cylinders 114 to articulate bucket 112 via linkage 110 to dig into and remove dirt, rock, sand, etc. from a portion of the work site and deposit this load in another location. Machine 100 can include a battery compartment connected to frame 102 and including a battery system 120. Battery system 120 is electrically coupled to the one or more electric motors of the machine 100.

The battery system 120 can include multiple large capacity battery cells (e.g., 750 Volt, 80 Amp-hour, or 60 kilowatt-hours) to provide a high-capacity electrical energy source. The battery cells 224 may be included in one battery pack or multiple battery packs connected in parallel in the battery system. In some examples, the battery system includes fuel cells that provide a high-capacity electrical energy source. The machine 100 may include multiple battery systems.

A battery system 120 may be used to provide a high voltage (e.g., 600V-1500V) direct current (DC) electrical energy source. The output of the battery system may be provided to a converter or inverter to produce a high voltage alternating current (AC) electrical energy source. The energy source or sources provide electrical power to electrical motors, pumps, etc., of the machine 100.

Routing the electric energy to the several compartments of the machine 100 that require electric power is challenging. The electric cables that carry high voltage electrical energy need a large diameter (e.g., 10 millimeters (10 mm) or greater). In some examples, the cables are wire gauge 0 or a greater diameter than wire gauge 0. Also, the cabling needs to be robust to safely transfer electrical energy while exposed to vibration, large temperature changes, and even submersion in water. The thick electrical cables that meet these requirements are stiff and have large bend diameters, making it difficult to route high-capacity cables efficiently in the machine 100.

Figure 2:
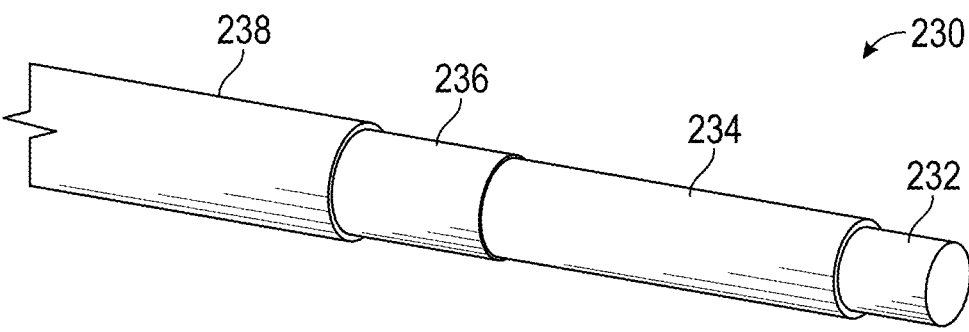
FIG. 2 is an illustration of a cable to carry high voltage electrical energy on a work machine in accordance with this disclosure.

FIG. 2 is an illustration of a cable 230 to carry high voltage electrical energy on a work machine such as the example machine 100 in FIG. 1. The cable 230 includes an electrically conductive core. The core 232 can include metal such as copper or aluminum. The core 232 may be a solid core wire or may be comprised of braided wire. The core 232 may have a diameter of 10 mm or greater, but different cables of the work machine may have different diameters based on the amount of electrical energy carried by the cable.

The core 232 is covered by a primary insulating layer 234 that electrically insulates the core 232. A shield layer 236 covers the insulating layer. The shield layer 236 may include braided stainless steel. The shield layer 236 can be grounded (e.g., to chassis ground of the work machine) to reduce electromagnetic emissions. The shield layer 236 is covered by a protective layer 238 (e.g., a protective braiding) that is abrasion resistant.

Figure 3:
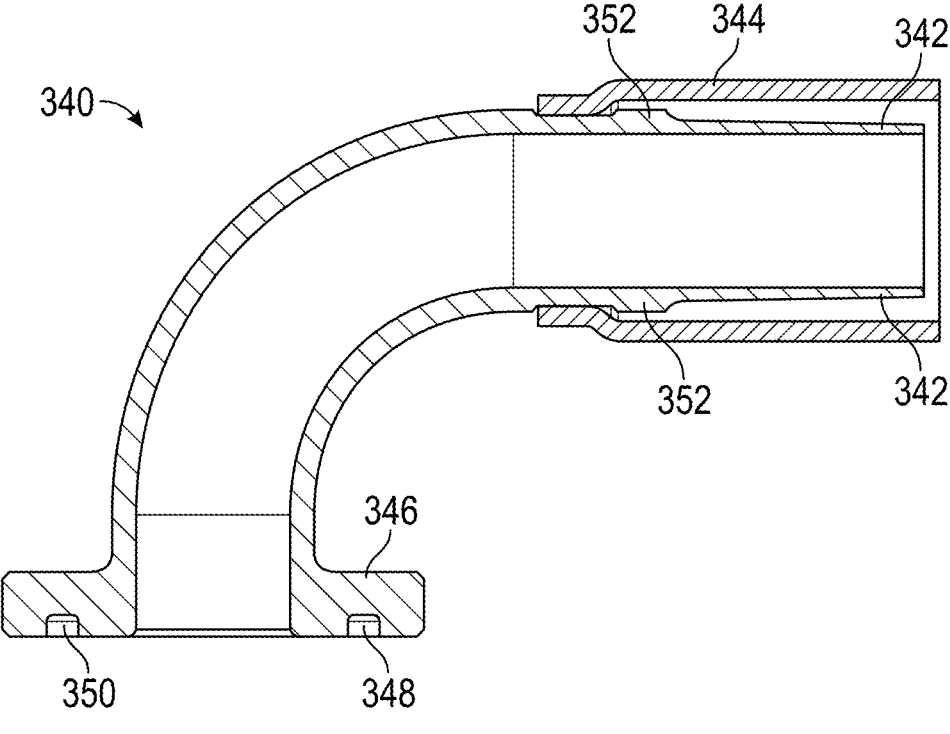
FIG. 3 is an illustration of a cross section view of an example of a cable routing coupling in accordance with this disclosure.

FIG. 3 is an illustration of a cross section view of an example of a cable routing coupling that makes it easier to route large capacity cables in a work machine. The cable routing coupling includes a collet 340 having an inner sleeve 342 that has the shape of a tube with a bend in it. The collet 340 also includes an outer sleeve 344 that covers a portion of the inner sleeve 342 on one end of the collet 340. The other end of the collet 340 also has a mounting collar 346. The mounting collar can include a circular groove 348 for holding a seal 350 (e.g., an O-ring gasket seal).

The inner sleeve 342 has a ridge 352 that rings the outside of the inner sleeve 342. The cross section of FIG. 3 shows that the inner sleeve 342 has a constant inside diameter, and also shows that the outside diameter of the inner sleeve 342 gradually increases from the end of the inner sleeve 342 to the ridge 352 of the inner sleeve 342, which changes the thickness of the inner sleeve. In the cross section, the change in thickness appears as a wedge with a slowly increasing slope. A cable (e.g., the example cable 230 of FIG. 2) is inserted through the collet 340 and extends beyond both ends of the collet 340.

Figures 4, 5:
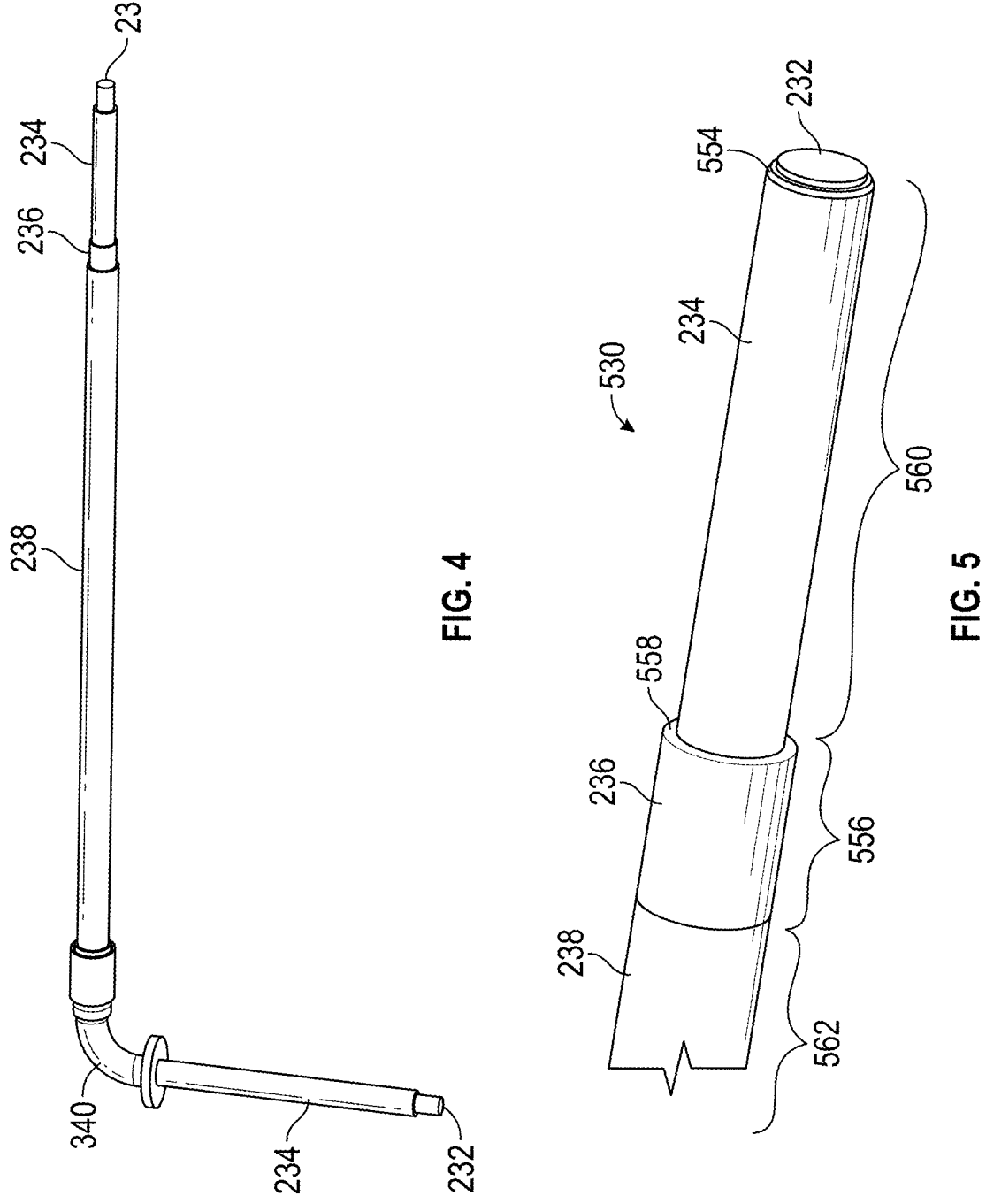
FIG. 4 is an illustration of an example of a high voltage cable inserted into a collet in accordance with this disclosure.
FIG. 5 is an illustration of a cable prepared for insertion into a collet in accordance with this disclosure.

FIG. 4 is an illustration of an example of the high voltage cable 230 of FIG. 2 inserted into the collet 340 of FIG. 3. The collet 340 includes a bend that provides a bend to the thick cable 230. In the example of FIG. 4, the collet has a 90-degree bend and the angle between the two lengths of the cable extending from the collet 340 is 90 degrees. The collet may have a sharper bend to provide a sharper acute angle between the two extending lengths of the cable (e.g., 15, 30, 45, 60, or 75 degree angle), or a less sharp obtuse angle between the two lengths of the cable (e.g., 105, 120 degree angle). In certain examples, the collet is straight and does not include an angle.

It can be seen in FIG. 4, that the cable core 232, the insulating layer 234, the shield layer 236, and protective layer 238 are present on one length of the cable extending from the collet 340, and only the insulating layer 234 and the cable core 232 are present on the other length of the cable extending from the collet. The length of the cable with only the insulating layer 234 and the cable core 232 is routed inside the machine compartment requiring the electrical energy, and the length of the cable with the protective layer 238 and shield layer 236 is routed outside and between machine compartments. The collet 340 also provides a robust and water-tight connection that prevents the cable 230 from becoming loose.

FIG. 5 is an illustration of a cable 530 (e.g., the cable 230 of FIG. 2) prepped for insertion into the collet 340 of FIG. 3. The inside diameter of the inner sleeve 342 of the collet 340 may be 0.1 mm to 0.2 mm greater than the outside diameter of the insulating layer 234. A beveled edge 554 may be added to the insulating layer 234 to make insertion of the cable easier. A portion of the shield layer 236 is folded back over part of the protective layer 238 to a fold length 556. The fold length 556 starts from the folded end 558 and is covered with two layers of the shield layer 236 with a protective layer 238 between the two shield layers. The inserted length 560 does not include a shield layer 256 or a protective layer 238. The length 562 of the cable behind the fold length includes one shield layer 236 under the protective layer 238.

Figure 6:
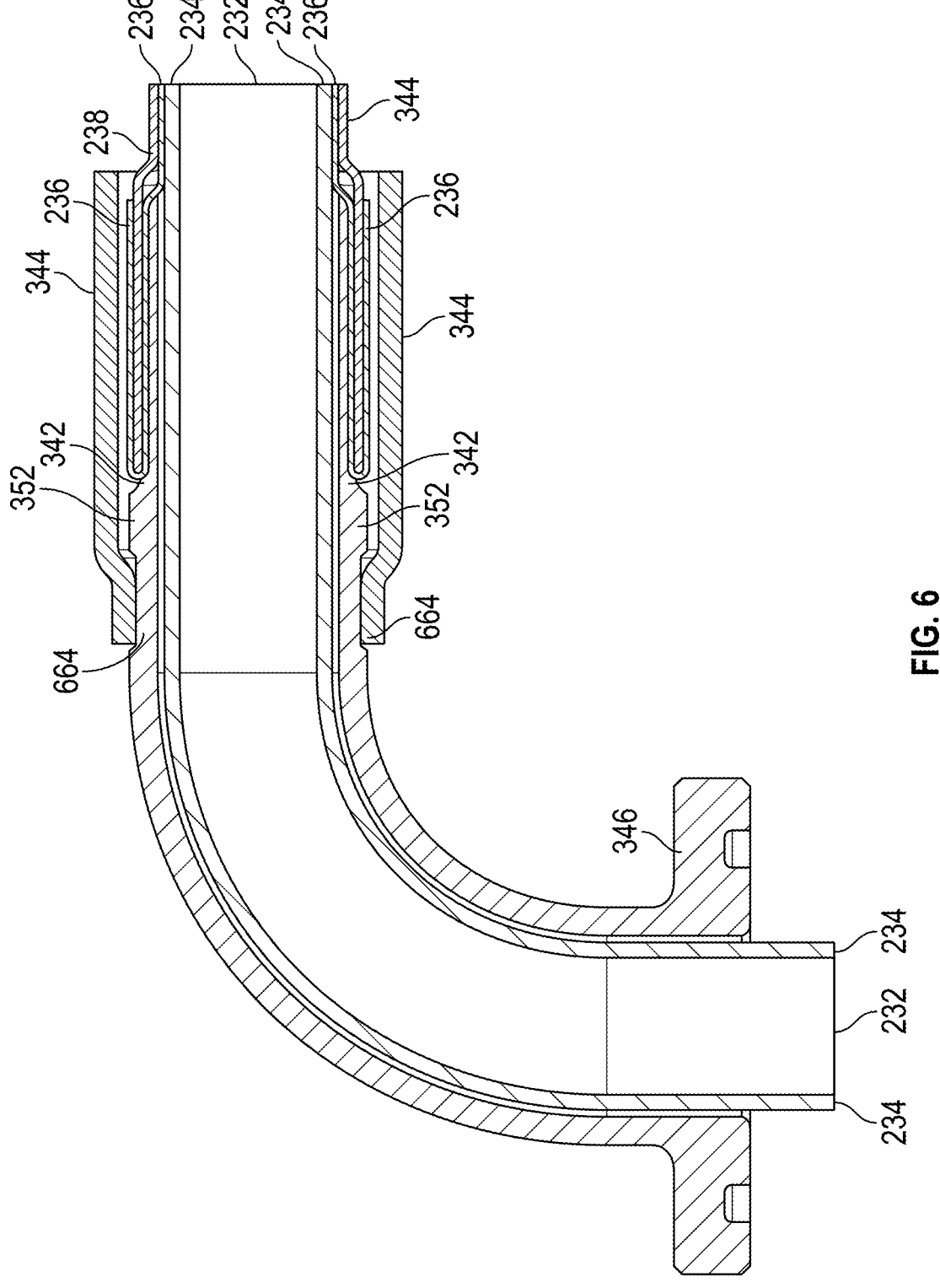
FIGS. 6 and 7 are illustrations of a cross section view of a cable inserted into a collet in accordance with this disclosure.

FIG. 6 is an illustration of a cross section view of the cable 530 of FIG. 5 inserted into the collet 340 of FIG. 3 to form a cable assembly for a work machine. The length of the cable with only a cable core 232 and insulating layer 234 passes through the collet 340 and extends the beyond the mounting collar 346 of the collet 340. The fold end of the folded shield layer 236 passes over the inner sleeve 342 and under the outer sleeve 344 up to the ridge 352 that provides a stop for the folded shield layer. At the end of the inner sleeve, the thinness of the inner sleeve 342 allows the inner sleeve to pass under the folded shield layer and protective layer, and the gradually increasing thickness helps in separating the folded shield layer and protective layer from the insulating layer 234 as the cable is inserted.

The outer sleeve 344 is crimped onto the inner sleeve of the collet 340 at one end of the outer sleeve 344. The inner sleeve may include a notched ring 664 to receive the crimped end of the outer sleeve 344. The folded shield layer and protective layer slide into the space between the inner sleeve 342 and the outer sleeve 344 as the cable is inserted. The fold length of the cable is positioned within the outer sleeve 344. When the cable is positioned, the outer sleeve 344 is compressed (e.g., by crimping) onto the fold length of the cable and the inner sleeve 342. Prior to the compressing, the cable may be rotatable about the center axis of the cable (e.g., 360 degrees rotatable) to assist with positioning of the thick cable.

Figure 7:
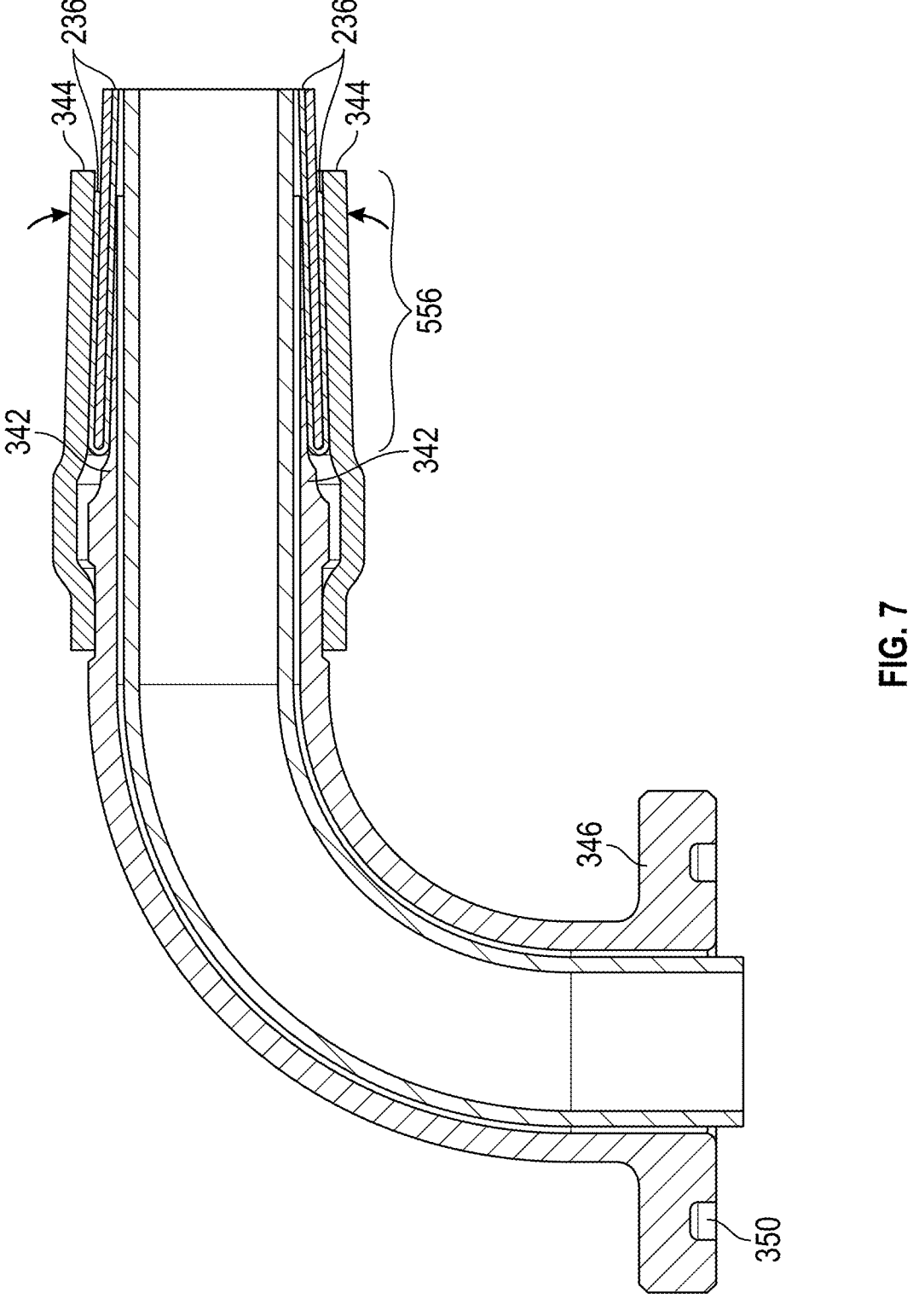

FIG. 7 is an illustration of a cross section view of a cable assembly. The outer sleeve 344 is shown compressed onto the inner sleeve 342 and the onto the fold length 556 of the cable. The inner surface of the inner sleeve 342 may include one or more barbs or teeth helping to create a watertight seal when the outer sleeve 344 is compressed onto the inner sleeve 342 and cable. The cable shield layer 236 contacts the collet, and the metal collet provides a ground path between the shield layer 236 and the electrical components attached to the other end of the cable. A flange (not shown) is placed over the collar 346 and bolted to the compartment housing. The seal 350 provides a watertight seal at the compartment end of the collet.

Figure 8:
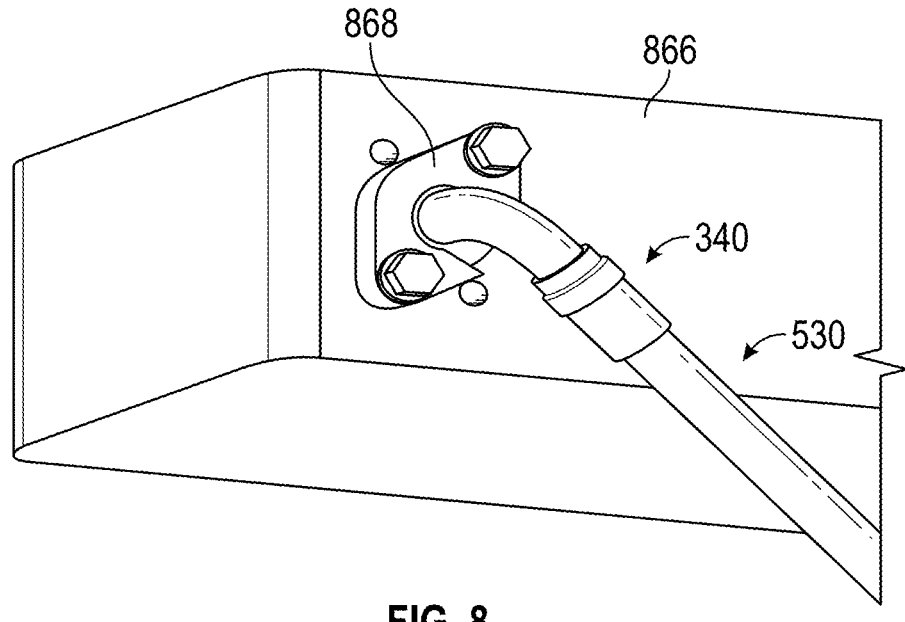
FIG. 8 is an illustration of an example of a collet and cable attached to a compartment of a work machine in accordance with this disclosure.

FIG. 8 is an illustration of the collet 340 and cable 530 attached to a compartment 866 holding the electrical components that may either source the electrical energy (e.g., a battery system 120) carried by the cable or use the electrical energy (i.e., an electrical load) carried by the cable 530. The mating housing face may be machined flat and then drilled and tapped with a four-bolt pattern. A flange 868 that is placed over the mounting collar is held in place with two bolts. Depending on the desired orientation of the coupling and cable, one set of holes will be used and the other not used. The arrangement provides unobstructed access to the bolts and avoids having one bolt buried under the collet 340 where it is more difficult to tightened.

Figure 9:
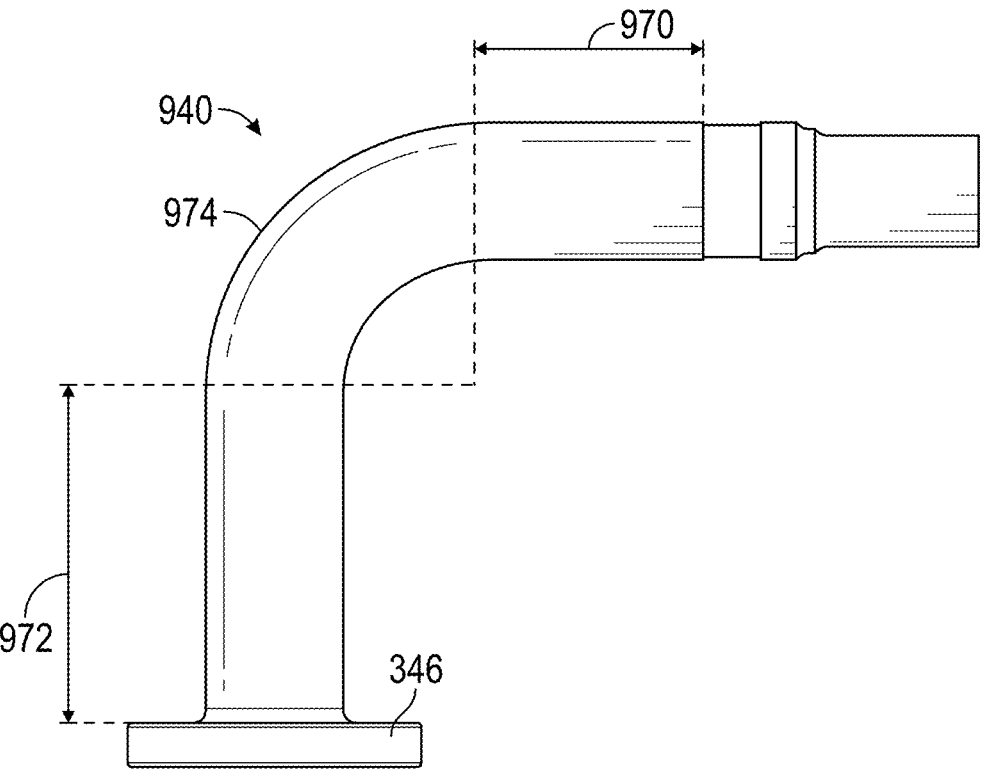
FIG. 9 is an illustration of another example of a collet in accordance with this disclosure.

FIG. 9 is an illustration of another example of a collet 940. The collet 940 includes a first straight section 970, a second straight section 972, and a collet bend 974 between the two sections. The example collet 940 in FIG. 9 shows that the two sections may have different lengths. Also, the bend angle between the two sections can vary to change the angle of the collet bend 974. The dimension of the collet bend 974 can vary with respect to the overall dimension of the collet, and the dimension of the mounting collar 346 can vary with respect to the dimension of the collet bend 974.

INDUSTRIAL APPLICABILITY

FIG. 10 is a flow diagram of an example of a method 1000 of making a cable assembly for a work machine (e.g., the cable assembly example in FIG. 7). At block 1005, an insulating layer is formed over an electrically conductive cable core. The cable core is sized to carry high voltage electric energy that can be either DC or AC. The cable may have a diameter of 10 mm or greater. The cable may be either solid wire or a braided wire.

At block 1010, an electrically conductive shield layer is formed over at least a portion of the insulating layer. The shield layer may include braided stainless steel. At block 1015, the shield layer is folded back to form a fold length having a double shield layer. The cable includes the shield layer covering the insulating layer over a first length of the cable, and the insulating layer exposed over a second length of the cable. The folded length is located between the other two lengths and includes two shield layers covering the insulating layer over the fold length of the cable. In some examples, a protective layer is formed over the shield layer. The protective layer may include a protective braiding that is resistant to abrasion. The shield layer may be folded back over the protective layer so that the fold length of the cable includes a portion of the protective layer between the two layers of the shield layer.

At block 1020, the second length of the cable that does not include the shield layer is inserted through an inner sleeve of a collet having a bend. A bevel may be added to the insulating layer. The bend may be a 90-degree bend or a sharper bend than 90 degrees. The bend may also be a bend less sharp than 90-degrees. Different bends allow for efficient routing of thick cables around different geometries of the work machine.

At block 1025, the fold length of the cable is inserted into the collet such that the insulating layer is under the inner sleeve of the collet, and the folded shield layer is over the inner sleeve of the collet and under the outer sleeve of the collet. The fold length is inserted until the fold end of the fold length reaches a stop of the collet. The stop may be a ridge formed on the outside surface of the inner sleeve of the collet. At block 1030, the outer sleeve is compressed (e.g., by crimping) over the fold length of the cable and the inner sleeve of the collet.

The method 1000 provides a cable assembly with a watertight seal that can be used on both the source end of the cable and the load end of the cable. Sharp bend angles are possible which allows for clearing different geometries of the work machine with the cables and installing the cables in a low-profile arrangement that reduces wear on the cables when the work machine is in use.

The above detailed description is intended to be illustrative, and not restrictive. The scope of the disclosure should, therefore, be determined with references to the appended claims, along with the full scope of equivalents to which such claims are entitled.

What is claimed is:

1. A collet for a cable assembly of a work machine, the collet comprising:
   an inner sleeve having a tube shape with a bend, the inner sleeve including:
      a first sleeve portion at an end of the collet and including a constant inner diameter and an outer diameter that increases from an end of the inner sleeve; and
      a second sleeve portion including a constant outer diameter; and
   an outer sleeve extending over the first sleeve portion of the inner sleeve.

2. The collet of claim 1,
   wherein the first sleeve portion of the inner sleeve includes a ridge that rings the inner sleeve and the outer diameter of the first portion of the inner sleeve increases from the end of the inner sleeve to the ridge of the inner sleeve; and
   wherein an end of the outer sleeve is crimped over the ridge of the inner sleeve.

3. The collet of claim 1, wherein the bend of the inner sleeve is at least a ninety-degree bend or sharper bend.

4. The collet of claim 1, wherein an inner surface of the first portion of the inner sleeve includes one or more barbs.

5. The collet of claim 1, wherein the inner sleeve includes a stop having a stop edge.

6. The collet of claim 5, wherein the outer diameter increases from the end of the collet to the stop edge.

7. The collet of claim 1, including a mounting collar at another end of the collet, wherein an opening of the mounting collar has the inner diameter.

8. The collet of claim 1, wherein the inner diameter is greater than or equal to ten millimeters (10 mm).

9. The collet of claim 1, including a first straight section and a second straight section, and the bend of the inner sleeve is between the first straight section and the second straight section, and wherein the first straight section has a different length than the second straight section.

10. The collet of claim 1, wherein the inner sleeve includes a notched ring on an outer surface of the inner sleeve.

* * * * *